United States Patent
Horie et al.

(10) Patent No.: US 10,848,632 B2
(45) Date of Patent: Nov. 24, 2020

(54) IMAGE PROCESSING APPARATUS CAPABLE OF FEEDING ELECTRIC POWERS IN COMPLIANCE WITH THE USB-PD STANDARD

(71) Applicant: Brother Kogyo Kabushiki Kaisha, Nagoya (JP)

(72) Inventors: Tsubasa Horie, Obu (JP); Hideki Arimoto, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/586,294

(22) Filed: Sep. 27, 2019

(65) Prior Publication Data

US 2020/0106910 A1 Apr. 2, 2020

(30) Foreign Application Priority Data

Sep. 28, 2018 (JP) .................................. 2018-186105

(51) Int. Cl.
*H04N 1/00* (2006.01)
*H02M 3/00* (2006.01)
*H02M 7/02* (2006.01)

(52) U.S. Cl.
CPC ..... *H04N 1/00896* (2013.01); *H04N 1/00904* (2013.01); *H04N 1/00907* (2013.01); *H02M 3/00* (2013.01); *H02M 7/02* (2013.01)

(58) Field of Classification Search
CPC combination set(s) only.
See application file for complete search history.

(56) References Cited

U.S. PATENT DOCUMENTS

| | | | |
|---|---|---|---|
| 9,692,923 B2 | 6/2017 | Achiwa et al. | |
| 2013/0002746 A1 | 1/2013 | Takayanagi et al. | |
| 2015/0264208 A1 | 9/2015 | Achiwa et al. | |
| 2017/0230527 A1* | 8/2017 | Wasamoto | H04N 1/00973 |
| 2019/0199880 A1* | 6/2019 | Abe | H04N 1/00904 |
| 2019/0238706 A1* | 8/2019 | Sakai | G06F 1/28 |
| 2019/0268493 A1* | 8/2019 | Sakai | H04N 1/00888 |

FOREIGN PATENT DOCUMENTS

| | | |
|---|---|---|
| JP | 2009-176210 A | 8/2009 |
| JP | 2013-034365 A | 2/2013 |
| JP | 2015-176442 A | 10/2015 |

* cited by examiner

*Primary Examiner* — Barbara D Reinier
(74) *Attorney, Agent, or Firm* — Banner & Witcoff, Ltd.

(57) ABSTRACT

An image processing apparatus has a normal mode and a power saving mode as a power consumption mode. In the normal mode in which an image processor requires electric power supply, a direct voltage output by an AC-DC converter is supplied to the image processor. A voltage according to a power feed request from an external device connected to an USB connector is output by a variable output DC-DC converter via a power-feed terminal. In the power saving mode in which the electric power supply for the image processor in unnecessary, the voltage according to the power feed request from the external device connected to the USB connector is output by the AC-DC converter without routing through the variable output DC-DC converter.

10 Claims, 8 Drawing Sheets

IMAGE PROCESSING APPARATUS CAPABLE OF FEEDING ELECTRIC POWERS IN COMPLIANCE WITH THE USB-PD STANDARD

CROSS-REFERENCE TO RELATED APPLICATIONS

This application claims priority under 35 U.S.C. § 119 from Japanese Patent Application No. 2018-186105 filed on Sep. 28, 2018. The entire subject matter of the application is incorporated herein by reference.

BACKGROUND

Technical Field

The present disclosures relate to an image processing apparatus.

Related Art

In recent years, there have been known apparatuses which fulfill a USB-PD (Universal Serial Bus-Power Delivery) standard. In such apparatuses, it is necessary to feed electric power in various voltages ranging from 5V to 20V, or electric powers ranging from 15 W to 100 W according to a power-supply requirement of a power feed destination as connected.

SUMMARY

In view of the above, aspects of the present disclosures provide an image processing apparatus capable of feeding electric powers in compliance with the USB-PD standard.

According to aspects of the present disclosure, there is provided an image processing apparatus having an image processor configured to perform an image processing, a USB connector to which an external device is connectable, the USB connector having a power-feed terminal through which power is fed to the external device and a communication terminal used for communication with the external device, a power source having an AC-DC converter and a variable output DC-DC converter, the AC-DC converter being configured to convert an alternating voltage supplied from a commercial power source to a first direct voltage and output the first direct voltage, the variable output DC-DC converter being configured to convert the first direct voltage output by the AC-DC converter to a second direct voltage and output the second direct voltage, the second direct voltage output by the variable output DC-DC converter being variable, a switching unit configured to be switched between a first switching state and a second switching state, the first switching state being a state where output by the AC-DC converter is output to the image processor and output by the variable output DC-DC converter is output to the power-feed terminal, the second switching state being a state where output by the AC-DC converter is output to the power-feed terminal, and a controller. The controller is configured to receive a power feed request from the external device through the communication terminal, in a case where the image processing apparatus operates in a normal mode in which a power is supplied to the image processor from the AC-DC converter switch the switching unit to the first switching state, cause the AC-DC convert to output the first direct voltage to the image processor, and cause the variable output DC-DC converter to output the second direct voltage to the external device in accordance with the power feed request, and, in a case where the image processing apparatus operates in a power saving mode in which a power is not supplied to the image processor from the AC-DC converter switch the switching unit to the second switching state, and cause the AC-DC convert to output the first direct voltage in accordance with the power feed request to the external device through the power-feed terminal.

According to aspects of the present disclosure, there is provided an image processing apparatus having an image processor configured to perform an image processing, a USB connector to which an external device is connectable, the USB connector having a power-feed terminal through which power is fed to the external device and a communication terminal used for communication with the external device, a power source having an AC-DC converter and a variable output DC-DC converter, the AC-DC converter being configured to convert an alternating voltage supplied from a commercial power source to a first direct voltage and output the first direct voltage, the variable output DC-DC converter being configured to convert the first direct voltage output by the AC-DC converter to a second direct voltage and output the second direct voltage, the second direct voltage output by the variable output DC-DC converter being variable, a switching unit configured to be switched between a first switching state and a second switching state, the first switching state being a state where output by the AC-DC converter is output to the image processor and output by the variable output DC-DC converter is output to the power-feed terminal, the second switching state being a state where output by the AC-DC converter is output to the power-feed terminal, and a controller. The controller section is configured to receive a power feed request from the external device through the communication terminal, in a case where a voltage in accordance with the power feed request is equal to or less than a particular value, switch the switching unit to the first switching state, cause the AC-DC convert to output the first direct voltage to the image processor, and cause the variable output DC-DC converter to output the second direct voltage to the external device in accordance with the power feed request, and, in a case where the voltage in accordance with the power feed request is more than the particular value, switch the switching unit to the second switching state, and cause the AC-DC convert to output the first direct voltage in accordance with the power feed request to the external device through the power-feed terminal.

BRIEF DESCRIPTION OF THE ACCOMPANYING DRAWINGS

DETAILED DESCRIPTION OF THE EMBODIMENTS

Hereinafter, referring to the accompanying drawings, embodiments according to aspects of the present disclosures will be described.

<Configuration of Image Processing Apparatus>

Figure 1:
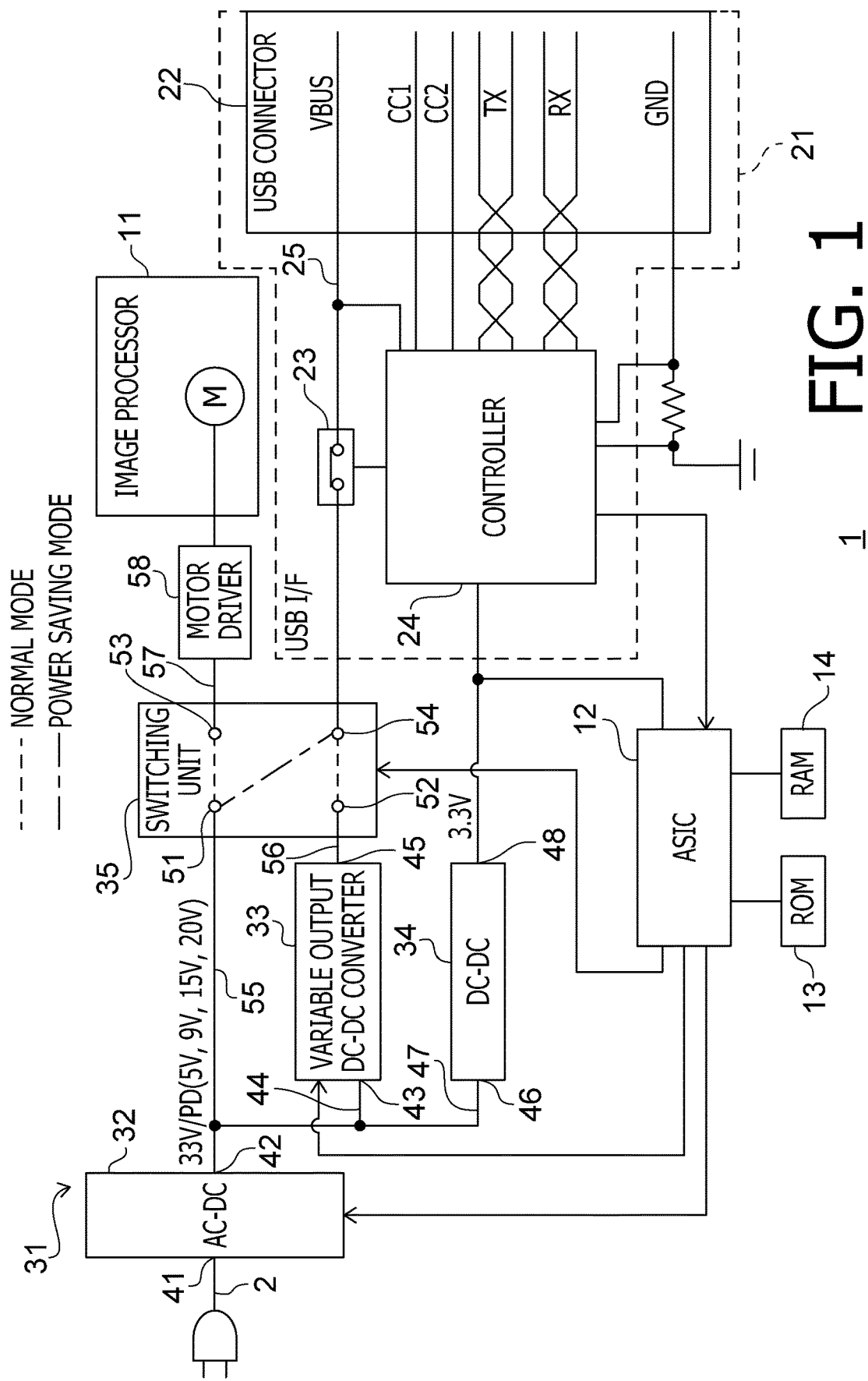
FIG. 1 shows an electrical configuration of an image processing apparatus according to a first illustrative embodiment of the present disclosures.

An image processing apparatus 1 shown in FIG. 1 is configured to operate with alternate electrical power supplied from an external commercial power source through a power-supply cord 2. The image processing apparatus 1 has an image processor 11 which is driven by a driving force of a motor M. The image processor 11 is, for example, an image forming section configured to form an image on each of printing sheets which are fed, one by one, along a sheet conveying passage defined inside a casing of the image processing apparatus 1.

The image processing apparatus 1 is provided with an ASIC (application specific integrated circuit) 12, a ROM (read only memory) 13 and a RAM (random access memory) 14. It is noted that the ASIC 12 is an example of a controller.

The ASIC 12 includes a CPU. The ROM 13 includes a non-volatile rewritable memory such as a flash memory. The ROM 13 stores programs to be executed by the ASIC 12 and/or various pieces of data. The RAM 14 includes, for example, a DRAM (dynamic RAM) and is mainly used as a work area when the ASIC 12 executes the programs.

The image processing apparatus 1 has a USB interface 21. The USB interface 21 is an interface to which an external device is connected, and is compliant with the well-known USB-PD standard. The USB interface 21 is provided with a USB connector 22, a switch 23 and a controller 24. It is noted that the controller 24 is an example of a controller.

The USB connector 22 is a female side of a Type-C connector and a receptor for receiving a male side of the Type-C connector is arranged so as to be exposed to outside. The USB connector 22 is provided with a VBUS terminal, a CC1 terminal, a CC2 terminal, a TX terminal, an RX terminal and a GND terminal.

The switch 23 is provided to a power-supply line 25 which is connected to the VBUS terminal of the USB connector 22. As the switch 23 is turned ON or OFF, the power-supply line 25 is connected or disconnected.

The controller 24 is connected to the CC1 terminal, the CC2 terminal, the TX terminal and the RX terminal of the USB connector 22 by wirings. The controller 24 performs data communication with the external device connected to the USB connector 22 through the TX terminal and the RX terminal. Further, the controller 24 controls ON-OFF switching of the switch 23 to control the power feed to the external device connected to the USB connector 22.

Prior to feeding of the electrical power to the external device, the controller 24 performs negotiation, via the CC1 terminal and the CC2 terminal, with the external device which is connected to the USB connector 22. In the negotiation, a voltage value and a current value which can be supplied in accordance with the Power Rules is notified from the controller 24 to the external device. According to the Power Rules, any of voltages of DC 5V, DC 9V, DC 12V and DC 20V can be supplied to the external device, while the maximal current value for the DC 5V, DC 9V and DC 12V is limited to 3 A and the maximum current value for the DC 20V is limited to 5 A. In the external device, from combinations of notified voltage values and current values, an appropriate combination of the voltage value and the current value is selected based on a required electrical power. Then, a power feed request for the selected combination of the voltage value and the current value is transmitted from the external device to the controller 24.

The image processing apparatus 1 has a power source 31. The power source 31 is provided with an AC-DC converter 32, a variable output DC-DC converter 33, a DC-DC converter 34 and a switching unit 35.

The AC-DC converter 32 is provided with a rectifying and smoothing circuit. To an input terminal 41 of the AC-DC converter 32, an alternating voltage supplied from an external commercial power source via the power-supply cord 2 is input. The AC-DC converter 32 converts the alternating voltage input to the input terminal 41 to a direct voltage in accordance with an instruction issued by the ASIC 12, and outputs the converted direct voltage from an output terminal 42.

The variable output DC-DC converter 33 is provide with a linear regulator. An input terminal 43 of the variable output DC-DC converter 33 is connected to a wiring 44, and the direct voltage output by the output terminal 42 of the AC-DC converter 32 is input to the input terminal 43 through the wiring 44. The variable output DC-DC converter 33 converts the direct voltage input to the input terminal 43 to a direct voltage in accordance with an instruction issued by the ASIC 12 and outputs the converted direct voltage from an output terminal 45.

The DC-DC converter 34 is provided with a linear regulator. To an input terminal 46 of the DC-DC converter 34, a wiring 47 is connected, and a direct voltage output by the output terminal 42 of the AC-DC converter 32 is input to the input terminal 46 through the wiring 47. The DC-DC converter 34 converts the direct voltage input to the input terminal 46 to a constant direct voltage (e.g., DC 3.3V) and outputs the converted direct voltage from the output terminal 48.

The switching unit 35 has a first input terminal 51, a second input terminal 52, a first output terminal 53 and a second output terminal 54. The first input terminal 51 is connected to the output terminal 42 of the AC-DC converter 32 through a wiring 55. The second input terminal 52 is connected to the output terminal 45 of the variable output DC-DC converter 33 through a wiring 56. To the first output terminal 53, an end of a wiring 57 is connected. The other end of the wiring 57 is connected to a motor driver 58 configured to control feeding of the electrical power to the motor M. To the second output terminal 54, the power-supply line 25 is connected.

The switching unit 35 is configured to be switchable between a first switching state and a second switching state.

When the switching unit 35 is in the first switching state, the first input terminal 51 and the first output terminal 53 are connected, and the second input terminal 52 and the second output terminal 54 are connected. Therefore, when the switching unit 35 is in the first switching state, the direct voltage output by the output terminal 42 of the AC-DC converter 32 is input to the motor driver 58, and the direct voltage output by the output terminal 45 of the variable output DC-DC converter 33 is input to the power-supply line 25. In other words, when the switching unit 35 is switched to the first switching state, output by the AC-DC converter 32 is switched to the motor M side, and output by the variable output DC-DC converter 33 is switched to the USB I/F 21 side.

When the switching unit 35 is in the second switching state, the first input terminal 51 and the second output terminal 54 are connected. Thus, when the switching unit 35 is in the second switching state, the direct voltage output by the output terminal 42 of the AC-DC converter 32 is input to the power-supply line 25. In other words, when the switching unit 35 is switched to the second switching state, output from the AC-DC converter 32 is switched to the USB I/F 21 side.

<Power Feed Control>

Figure 2:
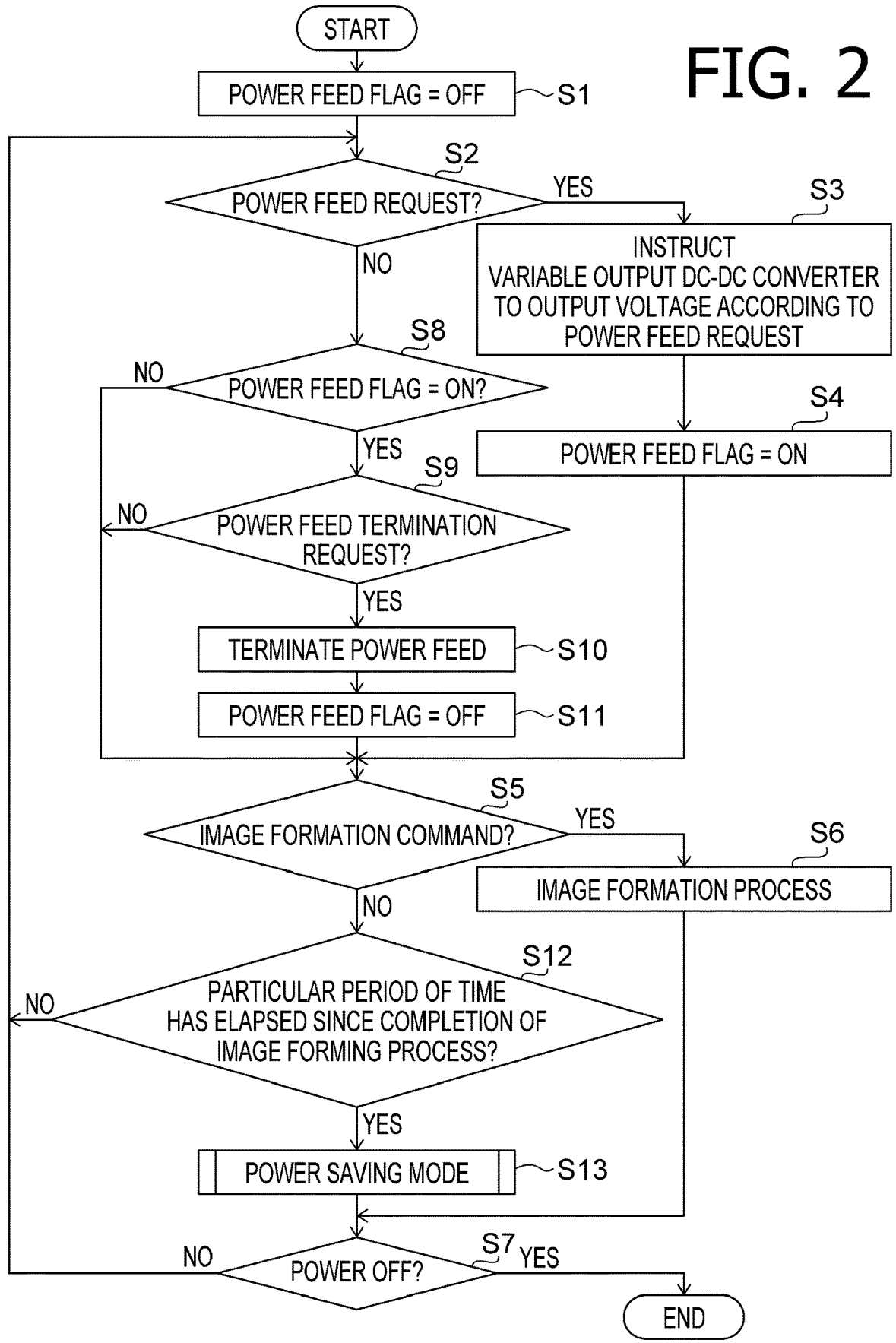
FIG. 2 is a flowchart illustrating a power feed controlling process performed in the image processing according to the first illustrative embodiment.

When the image processing apparatus 1 is powered ON, a power feed controlling process shown in FIG. 2 is performed by the ASIC 12 in order to control the power feed to respective sections of the image processing apparatus 1. Further, the image processing apparatus 1 is configured to operate, as a power consumption mode, in a normal mode or a power saving mode in which the power consumption of the image processing apparatus 1 is lower than in the normal mode Immediately after the image processing apparatus 1 is powered ON, the power consumption mode of the image processing apparatus 1 is set to the normal mode. When the image processing apparatus 1 operates in the normal mode, the switching unit 35 is set to the first switching mode.

In the power feed controlling process, the ASIC 12 turns OFF a power feed flag (S1). The power feed flag is an area allocated in the RAM 14 and one-bit information is to be stored in the power feed flag. The "OFF state" of the power feed flag means a value "0" is stored therein, which the "ON state" of the power feed flag means a value "1" is stored therein.

Next, the ASIC 12 determines whether the external device is connected to the USB connector 22. When it is determined that the external device is connected to the USB connector 22, the ASIC 12 determines whether a request for power feed is received from the external device (S2). When the negotiation is performed between the controller 24 of the USB interface 21 and the external device so that a power feed request for the power feed with the voltage value and the current value according to the Power Rules is transmitted from the external device to the controller 24, the power feed request is further transmitted from the controller 24 to the ASIC 12. In step S2, for example, when the external device is not connected to the USB connector 22, since the ASIC 12 cannot receive the power feed request from the external device, the ASIC 12 determine that no power feed request is received from the external device. Further, even when the external device is connected to the USB connector 22, if the external device dose not transmit the request power feed, the ASIC 12 determine that no power feed request is received from the external device. Further, when the external device is connected to the USB connector 22 and the external device transmits the power feed request, the ASIC 12 determine that the power feed request is received from the external device.

When it is determined that the external device is connected to the USB connector 22 and the power feed request is received from the external device (S2: YES), the ASIC 12 instructs the variable output DC-DC converter 33 to output the voltage in accordance with the power feed request (S3). Thus, the voltage according to the power feed request is output by the variable output DC-DC converter 33. Further, the ASIC 12 sets the power feed flag to ON (S4).

At this stage, the switching unit 35 is in the first switching state. Therefore, the voltage output by the output terminal 45 of the variable output DC-DC converter 33 is input to the second input terminal 52 of the switching unit 35, output by the second output terminal 54 of the switching unit 35, input to the power-supply line 25 therefrom, and then supplied to the external device through the VBUS terminal of the USB connecter 22.

Thereafter, the ASIC 12 determines whether an image formation command, i.e., an execution command of an image forming process to form an image on the printing sheet, is received from the external device such as a PC (personal computer) communicatably connected to the image processing apparatus 1 (S5). When it is determined that the image formation command is received (S5: YES), the ASIC 12 controls the image processor 11 to execute the image formation process (S6). At this time, the ASIC 12 instructs the AC-DC converter 32 to output the voltage of DC 33V, and the voltage of DC 33V output by the output terminal 42 of the AC-DC converter 32 is supplied to the motor driver 58.

After completing the image processing process, the ASIC 12 determines whether the power source of the image processing apparatus 1 is turned OFF (S7). When it is determined that the power is not turned OFF (S7: NO), the ASIC 12 again determines whether or not the power feed is requested by the external device connected to the USB connecter 22 (S2).

When it is determined that no external device is connected to the USB connector 22 or no power feed request is received from the external device connected to the USB connector 22 (S2: NO), the ASIC 12 determines whether the power feed flag is set to ON (S8).

When it is determined that the power feed flag is set to OFF (S8: NO), the ASIC 12 proceeds to S5 and determines whether the image formation command is received (S5). When the power feed flag is set to ON, the power feed to the external device connected to the USB connecter 22 is being performed. When it is determined that the power feed flag is set to ON (S8: YES), the ASIC 12 determines whether a power feed termination request is received from the external device (S9).

When the power feed termination request is transmitted from the external device to the controller 24, the power feed termination request is further transmitted from the controller 24 to the ASIC 12. When the power feed termination request is not received from the controller 24, the ASIC 12 determines that the external device has not issued the power feed termination request (S9: NO). Then, the ASIC 12 proceeds to S5 and determines whether the image formation command is received (S5).

When the ASIC 12 has received the power feed termination request from the controller 24 and thus it is determined that the power feed termination request is received from the external device (S9: YES), the ASIC 12 instructs the variable output DC-DC converter 33 to terminate the power feed. In response to the instruction to terminate the power feed, output of the voltage from the output terminal 45 of the variable output DC-DC converter 33 is stopped and the power feed from the VBUS terminal of the USB connecter 22 to the external device is stopped (S10). Further, at this stage, the ASIC 12 sets the power feed flag to OFF (S11). Thereafter, the ASIC 12 proceeds to S5 and determines whether the image formation command is received (S5).

In S5, when it is determined that the image formation command has not been received (S5: NO), the ASIC 12 determines whether a particular period of time has elapsed since completion of a previous image forming process (S12). When it is determined that the particular period of time has not elapsed (S12: NO), the ASIC 12 determines again whether the power feed request is received from the external device connected to the USB connector 22 (S2).

When it is determined that the particular period of time has elapsed since the execution of the previous image forming process (S12: YES), the ASIC 12 performs the power saving mode process (S13). The power saving mode process will be described below with reference to the flowchart shown in FIG. 3. After execution of the power saving mode process, the ASIC 12 determines whether the image processing apparatus 1 is powered OFF (S7). When it is determined that the image processing apparatus 1 is not powered OFF (S7: NO), the ASIC 12 determines again whether the power feed request is received from the external device connected to the USB connector 22 (S2). When it is determined that the image processing apparatus 1 is powered OFF (S7: YES), the ASIC 12 terminates the power feed controlling process.

<Power Saving Mode Process>

Figure 3A:
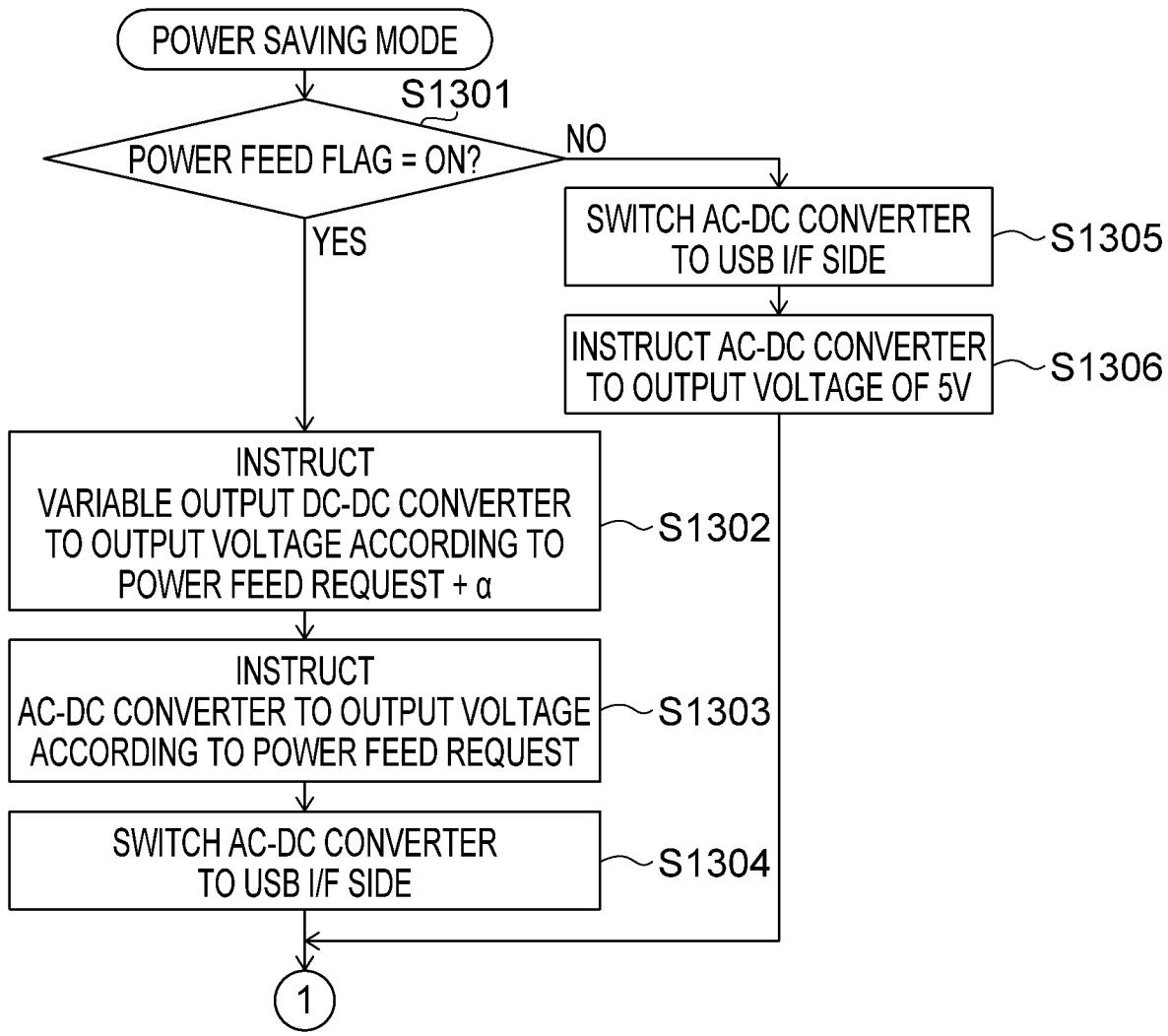
FIGS. 3A and 3B are flowcharts illustrating a power saving mode process according to aspects of the present disclosures.
Figure 3B:
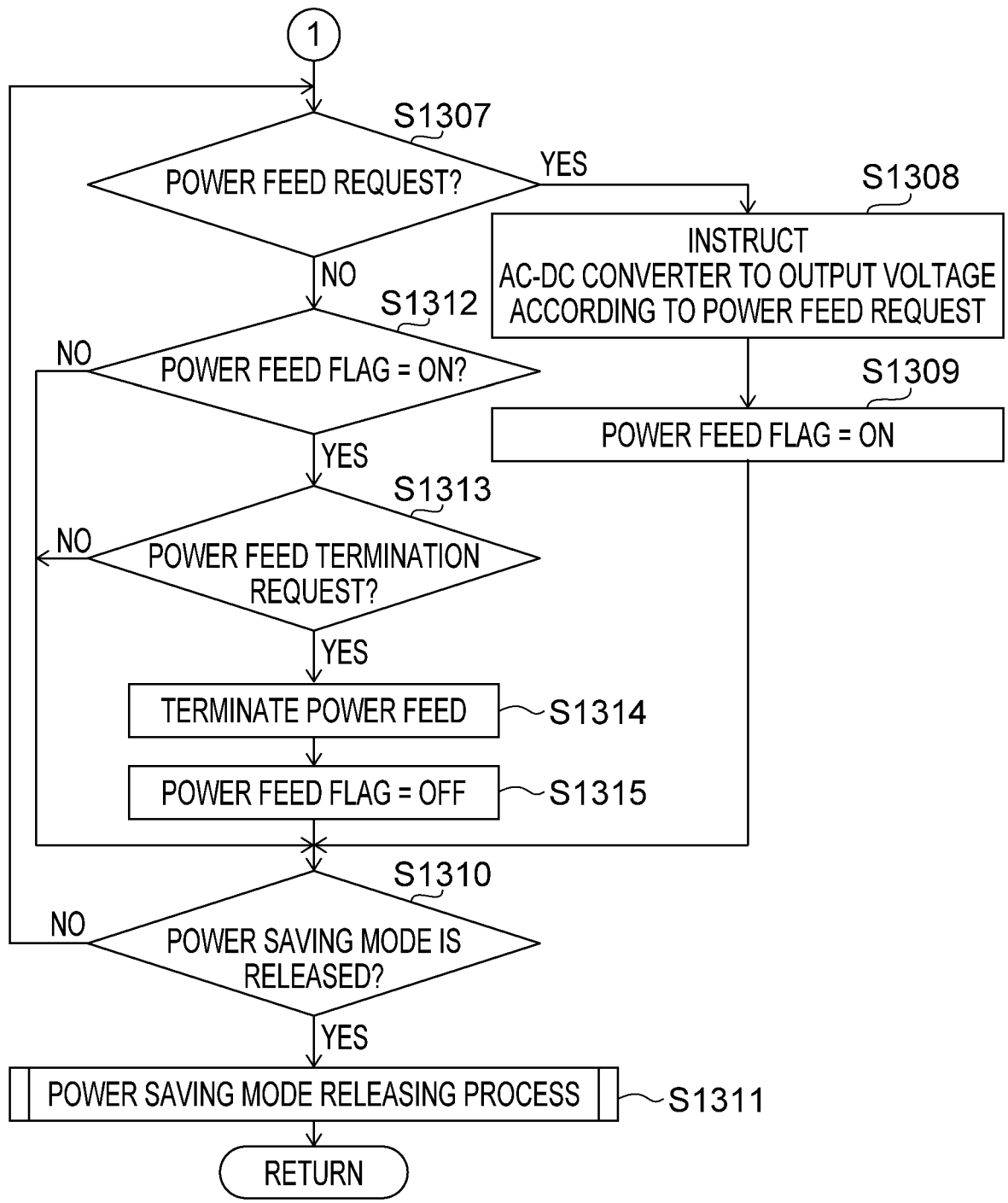

FIG. 3 is a flowchart of the power saving mode process which is performed in S13 of the flowchart shown in FIG. 2.

In the power saving mode process, the ASIC 12 determines whether the power feed flag is set to ON (S1301). When it is determined that the power feed flag is set to ON (S1301: YES), that is, when the power feed to the external device connected to the USB connector 22 is being performed, the ASIC 12 instructs the variable output DC-DC converter 33 to output a voltage which is a sum of a voltage in accordance with the power feed request from the external device and a particular voltage α (S1302). According to the above configuration, the voltage which is the sum of the voltage in accordance with the power feed request from the external device and the particular voltage α is output by the output terminal 45 of the variable output DC-DC converter 33. Further, the ASIC 12 instructs the AC-DC converter 32 to output a voltage in accordance with the power feed request from the external device (S1303). In response to this instruction, the voltage output by the output terminal 42 of the AC-DC converter 32 is lowered from DC 33V to the voltage in accordance with the power feed request, and the power consumption mode of the image processing apparatus 1 is changed from the normal mode to the power saving mode.

In a state where the voltage which is a sum of the voltage in accordance with the power feed request from the external device and the particular voltage α is output by the variable output DC-DC converter 33 and the voltage in accordance with the power feed request is output by the AC-DC converter 32, the ASIC 12 controls the switching unit 35 to switch the switching state from the first switching state to the second switching sate (S1304).

When the switching unit 35 is changed to the second switching state, the output terminal 42 of the AC-DC converter is changed from a state where the output terminal 42 is connected to the motor driver 58 to a state where the output terminal 42 is connected to the power-supply line 25. As a result, the voltage according to the power feed request and output by the output terminal 42 of the AC-DC converter 32 is applied to the power-supply line 25, and then, the voltage is supplied to the external device through the VBUS terminal of the USB connector 22.

When it is determined that the power feed flag is ON at the beginning of the power saving mode process (S1301: NO), the ASIC 12 switches the switching unit 35 from the first switching state to the second switching state (S1305) so that the output terminal 42 of the AC-DC converter 32 is changed from a state where the output terminal 42 is connected to the motor driver 58 to a state where the output terminal 42 is connected to the power-supply line 25. Thereafter, the ASIC 12 instructs the AC-DC converter 32 to output the voltage of DC 5V (S1306). With this control, the voltage of DC 5V is output by the output terminal 42 of the AC-DC converter 32 to the power-supply line 25. Thus, when the external device is connected to the USB connector 22, the controller 24 can start the negotiation with the external device by turning ON the switch 23. Further, as a result of lowering of the voltage, which is output by the output terminal 42 of the AC-DC converter 32, from DC 33V to DC 5V, the power consumption mode of the image processing apparatus 1 is changed from the normal mode to the power saving mode.

Thereafter, the ASIC 12 determines whether the external device is connected to the USB connecter 22, and when it is determined that the external device is connected to the USB connecter 22, the ASIC 12 further determines whether the power feed request is received from the external device (S1307). When it is determined that the external device is connected to the USB connecter 22 and further the power feed request is received from the external device (S1307: YES), the ASIC 12 instructs the AC-DC converter 32 to output the voltage according to the power feed request (S1308). According to the above control, the voltage according to the power feed request is output by the AC-DC converter 32. Then, the ASIC 12 turns ON the power feed flag (S1309).

Next, the ASIC 12 determines whether a releasing condition for the power saving mode is fulfilled (S1310). The releasing condition for the power saving mode is, for example, receipt of the image formation command from the external device which is communicatably connected to the image processing apparatus 1, or a user operation of an operation section provided to the image processing apparatus 1. When it is determined that the releasing condition for the power saving mode is fulfilled (S1310: YES), the ASIC 12 performs a power saving mode releasing process (S1311). After execution of the power saving mode releasing process, the power saving mode process is terminated and the process performed by the ASIC 12 is returned to the power feed controlling process. The power saving mode releasing process will be described later.

When it is determined that the releasing condition of the power saving mode is not fulfilled (S1310: NO), the ASIC 12 determines again whether the power feed request is received from the external device connected to the USB connecter 22 (S1307).

When it is determined that no external device is connected to the USB connecter 22, or no power feed request is received from the external device connected to the USB connecter 22 (S1307: NO), the ASIC 12 determines whether the power feed flag is ON (S1312).

When it is determined that the power feed flag is ON (S1312: NO), the ASIC 12 determines whether the releasing condition for the power saving mode is fulfilled (S1310). When the power feed flag is ON, the power feed to the external device connected to the USB connecter 22 is being performed. When it is determined that the power feed flag is ON (S1312: YES), the ASIC 12 further determines whether the power feed termination request is received from the external device (S1313).

When the power feed termination request is transmitted from the external device to the controller 24, the power feed termination request is transmitted from the controller 24 to the ASIC 12. When the ASIC 12 has not received the power feed termination request from the controller 24, the ASIC 12 determines that the no power feed termination request is received from the external device (S1313: NO) and determines whether the releasing condition for the power saving mode is satisfied (S1310).

When the ASIC 12 has received the power feed termination request from the controller 24 and thus determines that the power feed termination request is received from the external device (S1313: YES), the ASIC 12 instructs the AC-DC converter 32 to terminate the power feed. In response to receipt of the instruction to terminate the power feed, output of the voltage from the output terminal 42 of the AC-DC converter 32 is terminated, and the power feed from the VBUS terminal of the USB connector 22 to the external device is terminated (S1314). Further, the ASIC 12 sets the power feed flag to OFF (S1315). Thereafter, the ASIC 12 determines whether the releasing condition for the power saving mode is fulfilled (S1310).

<Power Saving Mode Releasing Process>

Figure 4:
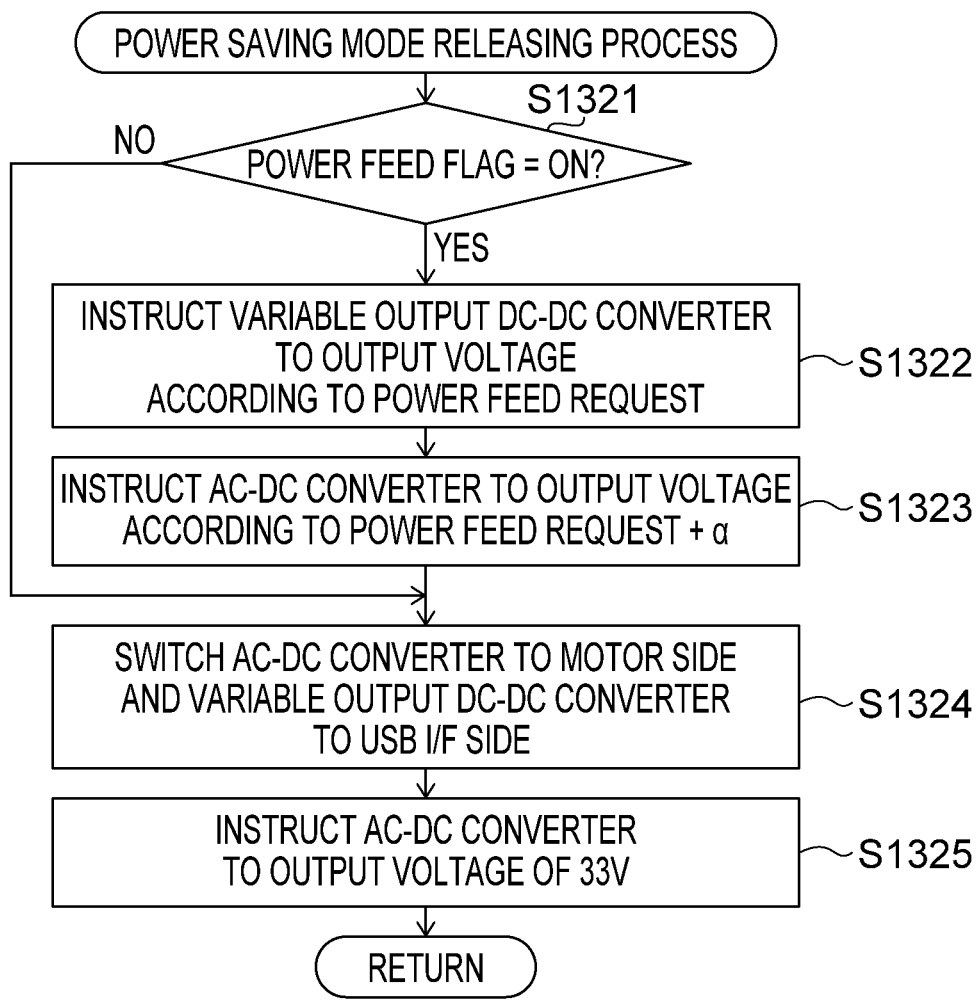
FIG. 4 is a flowchart illustrating a power saving mode releasing process according to aspects of the present disclosures.

FIG. 4 is a flowchart illustrating the power saving mode releasing process which is performed in S1311 of the flowchart shown in FIG. 3.

In the power saving mode releasing process, the ASIC 12 determines whether the power feed flag is set to ON (S1321). When it is determined that the power feed flag is set to ON (S1321: YES), that is, when the power feed to the external device connected to the USB connector 22 is being performed, the ASIC 12 instructs the variable output DC-DC converter 33 to output the voltage according to the power feed request from the external device (S1322). With this control, the voltage according to the power feed request is output by the output terminal 45 of the variable output DC-DC converter 33. Further, the ASIC 12 instructs the AC-DC converter 32 to output a voltage which is a sum of the voltage according to the power feed request from the external device and the particular voltage α (S1323). In response to this instruction, the voltage, which is the sum of the voltage according to the power feed request from the external device and the particular voltage α, is output by the output terminal 45 of the AC-DC converter 32.

In a state where the voltage according to the power feed request is output by the variable output DC-DC converter 33 and the voltage, which is the sum of the voltage according to the power feed request from the external device and the particular voltage α, is output by the output terminal 45 of the AC-DC converter 32, the ASIC 12 controls the switching unit 35 to change the switching state from the second switching state to the first switching state (S1324). When the switching state of the switching unit 35 is switched to the second switching state, a state of the output terminal 42 of the AC-DC converter 32 is switched from a state of being connected to the power-supply line 25 to a state of being connected to the motor driver 58. Further, the output terminal 45 of the variable output DC-DC converter 33 is connected to the power-supply line 25. As a result, the voltage according to the power feed request of the external device is output by the output terminal 45 of the variable output DC-DC converter 33 to the power-supply line 25, and the voltage is supplied to the external device through the VBUS terminal of the USB connector 22.

Thereafter, the ASIC 12 instructs the AC-DC converter 32 to output the voltage of DC 33V (S1325) and terminates the power saving mode releasing process. As the voltage of DC 33V is output by the output terminal 42 of the AC-DC converter 32, the power saving mode is released, and the power consumption mode of the image processing apparatus 1 is changed to the normal mode.

<Effects>

In the normal mode in which the electric power supply to the image processor 11 is necessary, the DC current from the AC-DC converter 32 is supplied to the image processor 11. Regarding the voltage according to the power feed request from the external device connected to the USB connector 22, such a voltage is output by the variable output DC-DC converter 33 to the external device via the power-feed terminal.

In the power saving mode in which the electric power supply to the image processor 11 is not necessary, the voltage according to the power feed request from the external device connected to the USB connector 22 is output by the AC-DC converter 32 to the external device without using the variable output DC-DC converter 33. Since the DC voltage converted by the AC-DC converter 32 is directly output to the external device without routing through the variable output DC-DC converter 33, the variable output DC-DC converter 33 does not convert the DC voltage, and thereby deterioration of conversion efficiency of the electrical power can be suppressed.

When the mode changes from the normal mode to the power saving mode, prior to switch of the switching unit 35 from the first switching state to the second switching state, the variable output DC-DC converter 33 outputs a voltage which is a sum of the voltage according to the power feed request and the particular voltage α. Therefore, an amount of accumulated charges to a capacitor provided between the VBUS terminal of the USB connecter 22 (or, the power-supply line 25) and the ground is increased. Then, after the voltage according to the power feed request is output by the AC-DC converter 32, the switching unit 35 is switched from the first switching state to the second switching state, and the DC current output by the AC-DC converter is supplied to the external device. Accordingly, in a case where the mode is switched from the normal mode to the power saving mode, lowering of the voltage at the VBUS terminal can be suppressed, thereby the voltage supplied to the external device being maintained stably.

When the mode changes from the power saving mode to the normal mode, prior to switch of the switching unit 35 from the second switching state to the first switching state, the AC-DC converter 32 outputs a voltage which is the sum of the voltage according to the power feed request and the particular voltage α. Therefore, the accumulated amount of electrical charges to the capacitor provided between the VBUS terminal of the USB connecter 22 (or, the power-supply line 25) and the ground increases. Then, after output of the voltage according to the power feed request from the variable output DC-DC converter 33 is started, the switching unit 35 is switched from the second switching state to the first switching state, and the DC current output by the variable output DC-DC converter 33 is supplied to the external device. Thus, in a case where the mode is changed from the power saving mode to the normal mode, lowering of the voltage at the VBUS terminal can be suppressed, thereby the voltage supplied to the external device being maintained stably.

Other Embodiments

Figure 5:
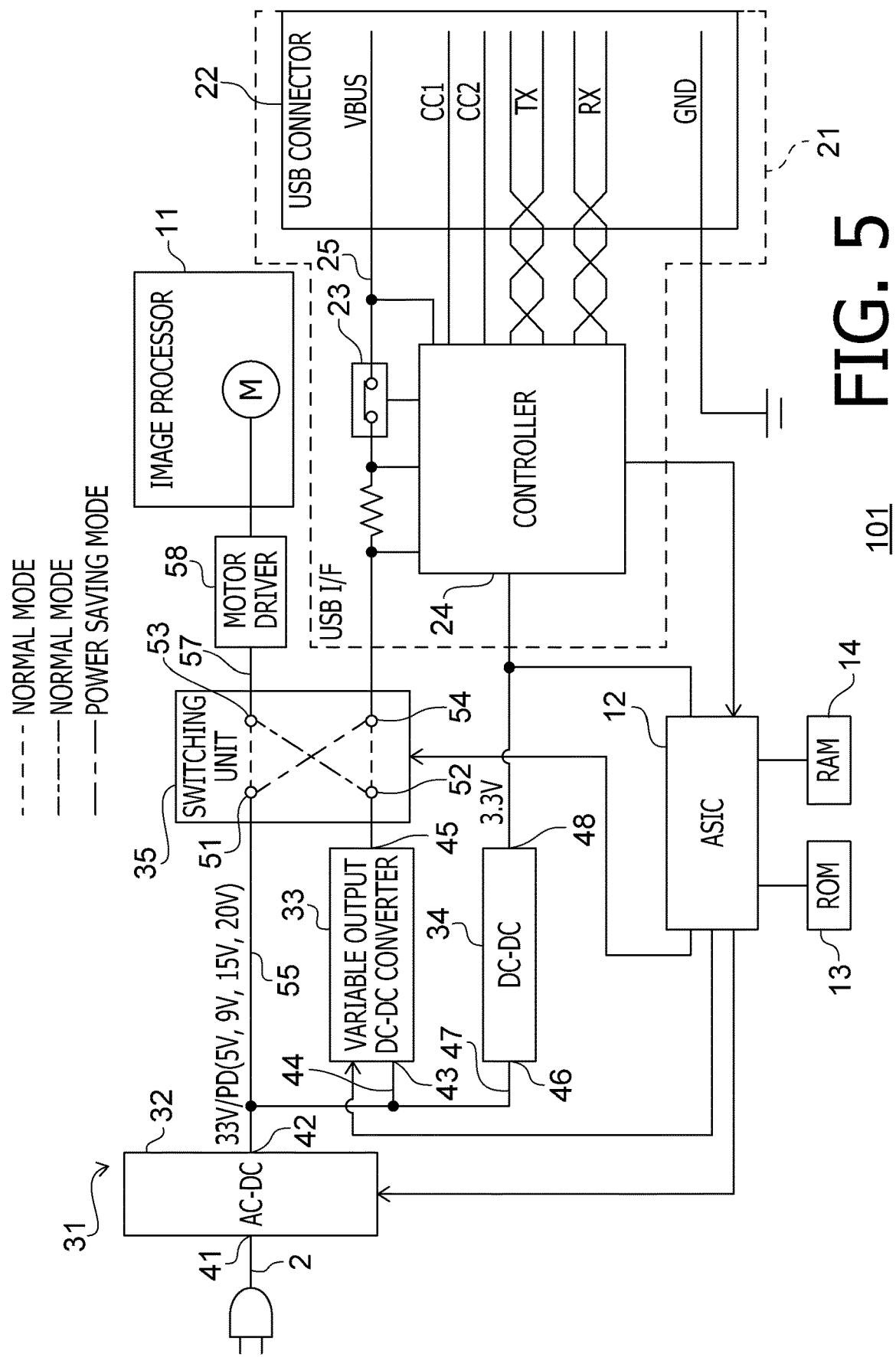
FIG. 5 shows an electrical configuration of an image processing apparatus according to a second illustrative embodiment of the present disclosures.

FIG. 1 shows the block diagram of the image processing apparatus 1 according to the first embodiment of the present disclosures, while FIG. 5 shows the block diagram of an image processing apparatus 101 according to a second embodiment of the present disclosures. In FIG. 5, portions/ parts same as those of the first embodiment are assigned with the same reference numbers and descriptions thereof may be simplified or omitted.

According to the image processing apparatus 101, the switching unit 35 switches the mode among the first switching state, the second switching state and a third switching state.

In the first switching mode, the first input terminal 51 and the first output terminal 53 are connected to each other, and the second input terminal 52 and the second output terminal 54 are connected to each other. Accordingly, in the first switching state, the DC voltage output from the output terminal 42 of the AC-DC converter 32 is input to the motor driver 58, while the DC voltage output by the output terminal 45 of the variable output DC-DC converter 33 is input to the power-supply line 25.

In the second switching state, the first input terminal 51 and the second output terminal 54 are connected to each other. Accordingly, the DC voltage output by the output terminal 42 of the AC-DC converter 32 is input to the power-supply line 25.

In the third switching state, the first input terminal 51 and the second output terminal 54 are connected to each other, and the second input terminal 52 and the first output terminal 53 are connected to each other. Accordingly, in the third switching state, the DC voltage output by the output terminal 42 of the AC-DC converter 32 is input to the power-supply line 25, while the DC voltage output by the output terminal 45 of the vatable output DC-DC converter 33 is input to the motor driver 58.

<Power Feed Control>

Figure 6:
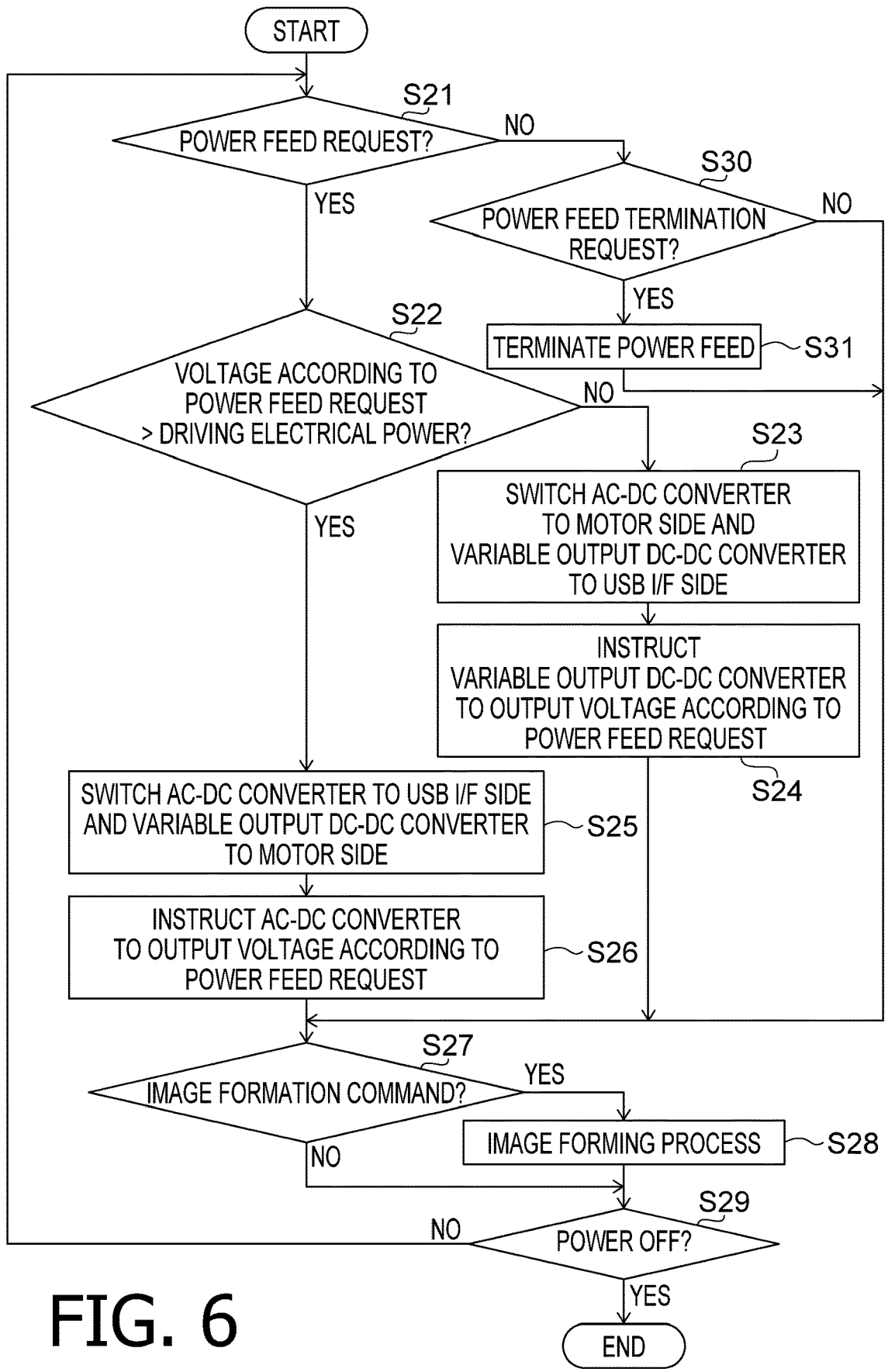
FIG. 6 is a flowchart illustrating a power feed controlling process performed in the image processing apparatus according to the second illustrative embodiment.

When the image processing apparatus 101 is powered ON, the power feed controlling process (see FIG. 6) is performed by the ASIC 12 in order to control power feed to respective components of the image processing apparatus 101. Immediately after the image processing apparatus 101 is powered ON, the power consumption mode is set to the normal mode. When the power consumption mode is the normal mode, the switching unit 35 is set to the first switching state. At this stage, the ASIC 12 instructs the AC-DC converter 32 to output the voltage of DC 33V. The voltage of DC33 V output by the output terminal 42 of the AC-DC converter 32 is input to the motor driver 58.

In the power feed controlling process, the ASIC 12 firstly determines whether the external device is connected to the USB connecter 22. When it is determined that the external device is connected to the USB connecter 22, the ASIC 12 determines whether a power feed request has been output by the external device (S21).

When it is determined that the external device is connected to the USB connecter 22 and the power feed request is received from the external device (S21: YES), the ASIC 12 compares the electrical power according to the power feed and the driving electrical power of the motor M and determines whether the electrical power according to the power feed request is larger than the driving electrical power of the motor M, that is, the electrical power supplied to the motor driver 58 (S22).

When it is determined that the electrical power according to the power feed request is not larger than (i.e., equal to or less than) the driving electrical power of the motor M (S22: NO), the ASIC 12 leaves the switching unit 35 to be in the first switching state. Accordingly, the output terminal 42 of the AC-DC converter 32 is maintained to be connected to the motor driver 58, while the output terminal 45 of the variable output DC-DC converter 33 is maintained to be connected to the power supply line 25 (S23).

However, if the switching unit 35 is in a state other than the first switching state at the time when it is determined that the electrical power according to the power feed request is not larger than the driving electrical power of the motor M (S22: NO), the ASIC12 switches the switching unit 35 to the first switching state in S23. Then, the ASIC 12 instructs the variable output DC-DC converter 33 to output the voltage according to the power feed request from the external device 32 (S24). As a result, the voltage of DC 33V output by the output terminal 42 of the AC-DC converter 32 is input to the motor driver 58, and the voltage according to the power feed request output from the output terminal 45 of the variable output DC-DC converter 33 is supplied to the external device through the power-supply line 25 and the VBUS terminal of the USB connector 22.

When it is determined that the electrical power according to the power feed request is larger than the driving electrical power of the motor M (S22: YES), the ASIC 12 switches the switching unit 35 from the first switching state to the third switching sate. Then, the output terminal 42 of the AC-DC converter 32 is connected to the power-supply line 25 and the output terminal 45 of the variable output DC-DC converter 33 is connected to the motor driver 58 (S25).

Thereafter, the ASIC 12 instructs the AC-DC converter 32 to output the voltage according to the power feed request of the external device (S26). Further, the ASIC 12 instructs the variable output DC-DC converter 33 to output the voltage of DC 33V. As a result, the DC 33V output by the output terminal 45 of the variable output DC-DC converter 33 is input to the motor driver 58, and the voltage according to the power feed request output by the output terminal 42 of the AC-DC converter 32 is input to the external device through the power-supply line 25 and the VBUS terminal of the USB connecter 22.

After the ASIC 12 instructs the AC-DC converter 32 of the variable output DC-DC converter 33 to output the voltage according to the power feed request, the ASIC 12 determines whether an image formation command is received from the external device which is communicatably connected to the image processing apparatus 101 (S27). When it is determined that the image formation command is received (S27: YES), the ASIC 12 controls the image processor 11 to perform the image forming process (S28).

After completion of the image forming process, the ASIC 12 determines whether the image processing apparatus 101 is powered OFF (S29). Further, when it is determined that the image formation command has not been received from the external device that is communicatably connected to the image processing apparatus 101 (S27: NO), it is further determined whether the image processing apparatus 101 is powered OFF (S29).

When it is determined that the image processing apparatus 101 is not powered OFF (S29: NO), the ASIC 12 determines whether the power feed request is received from the external device connected to the USB connecter 22 (S21). When it is determined that the image processing apparatus is powered OFF (S29: YES), the ASIC 12 terminates the power feed controlling process.

When it is determined that the power feed request has not been received from the external device during execution of power feed to the external device (S21: NO), the ASIC 12 determines whether a power feed termination request has been transmitted from the external device (S30). When the power feed termination request has not been received from the controller 24, the ASIC 12 determines that the power feed termination request has not been transmitted from the external device (S30: NO), and determines whether the image formation command has been received (S27).

When the power feed termination request has been notified from the controller 24 and the ASIC 12 determines that the power feed termination request is received from the external device (S30: YES), the ASIC 12 instructs termination of the power feed to the AC-DC converter 32 or the variable output DC-DC converter 33, which is outputting the voltage according to the power feed request (S31). In response to receipt of the instruction to terminate the power feed, output of the voltage from the AC-DC converter 32 or the variable output DC-DC converter 33 is terminated, and the power feed from the VBUS terminal of the USB connecter 22 to the external device is terminated (S31). Thereafter, the ASIC 12 determines whether the image formation command is received (S27).

When the particular period of time has elapsed since completion of the previous image forming process, the power saving mode process may be performed. To the power saving mode process, the power saving mode process shown in FIG. 3 can be applied. Further, to the power saving releasing process in the power saving mode process, the power saving mode releasing process shown in FIG. 4 can be applied.

<Effects>

According to the power feed controlling process, when the electrical power according to the power feed request from the external device connected to the USB connecter 22 is equal to or less than the driving power of the motor M, the DC voltage output by the AC-DC converter 32 is supplied to the image processor 11. The electrical power according to the power feed request is output to the external device from the variable output DC-DC converter 33 through the VBUS terminal of the USB connector 22.

When the electrical power according to the power feed request from the external device connected to the USB connecter 22 is larger than the driving power of the motor M, the electrical power according to the power feed request is output from the AC-DC converter 32 to the external device, without routing through the DC-DC converter 33. Since the DC voltage (e.g., the voltage according to the power feed request) output by the AC-DC converter 32 is directly output to external device without converting the same using the DC-DC converter 33, deterioration of power conversion efficiency can be suppressed.

<Modifications>

It is noted that aspects of the present disclosures need not be limited to the above-described illustrative embodiments but can include further modifications.

Figure 7:
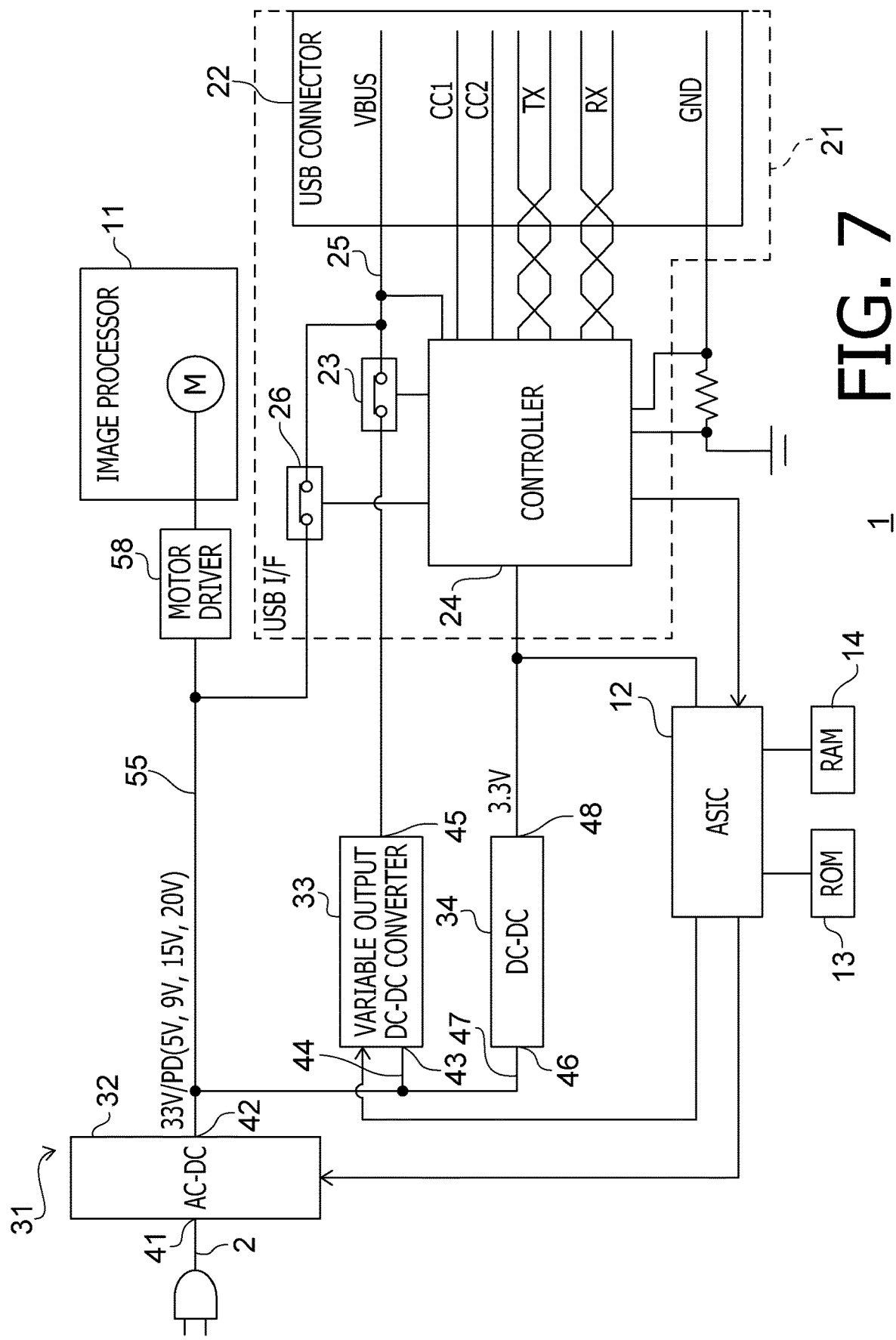
FIG. 7 shows a modification of the image processing apparatus shown in FIG. 1.

For example, the configuration of the image processing apparatus 1 need not be limited to that shown in FIG. 1 but can be the configuration as shown in FIG. 7. In the configuration shown in FIG. 7, the switching unit 35 is omitted, while a switch 26 is added to the USB interface 21. One end of the switch 26 is connected to the wiring 55, while the other end of the switch 26 is connected to the power-supply line 25 at a portion between the VBUS terminal of the USB connecter 22 and the switch 23. One end of the switch 23 is connected to the variable output DC-DC converter 33, while the other end of the switch 23 is connected to the VBUS terminal of the USB connecter 22. Further, by the wiring 55, the output terminal 42 of the AC-DC converter 23 and the motor driver 58 are connected to each other.

It is noted that ON/OFF states of the switch 26 is controlled by the controller 24 of the USB interface 21. By turning ON the switch 23 and turning OFF the switch 26, the output terminal 42 of the AC-DC converter 32 is connected to the motor driver 58 and the output terminal 45 of the variable output DC-DC converter 32 is connected to the power-supply line 25. Accordingly, the connection state is the same as the first switching state of the switching unit 35 shown in FIG. 1. When the switch 23 is turned OFF and the switch 26 is turned ON, the output terminal 42 of the AC-DC converter 32 is connected to the power-supply line 25. This connection state is the same as the second switching state of the switching unit 35 shown in FIG. 1.

According to the above-described illustrative embodiments, the ASIC 12 is configured to control switching of the switching unit 35 and instruct the AC-DC converter 32 and the variable output DC-DC converter 33 about output voltage. Alternatively, the controller 24 of the USB interface 21 may control switching of the switching unit 35 and instruct the AC-DC converter 32 and the variable output DC-DC converter 33 about the output voltage. According to such a configuration, amount of information transmitted from the controller 24 to the ASIC 12 can be reduced and efficiency of control may be achieved.

In the illustrative embodiments, the image processor 11 is described as the image forming device. However, optionally or alternatively, the image processor 11 may be an image scanner configured to read an original with an image sensor and generate image data representing the read image.

It is noted that the above-described configurations may be modified in various ways without departing from the aspects of the present disclosures.

What is claimed is:

1. An image processing apparatus comprising:
   an image processor configured to perform an image processing;
   a USB connector to which an external device is connectable, the USB connector having a power-feed terminal through which power is fed to the external device and a communication terminal used for communication with the external device;
   a power source having an AC-DC converter and a variable output DC-DC converter, the AC-DC converter being configured to convert an alternating voltage supplied from a commercial power source to a first direct voltage and output the first direct voltage, the variable output DC-DC converter being configured to convert the first direct voltage output by the AC-DC converter to a second direct voltage and output the second direct voltage, the second direct voltage output by the variable output DC-DC converter being variable;
   a switching unit configured to be switched between a first switching state and a second switching state, the first switching state being a state where output by the AC-DC converter is output to the image processor and output by the variable output DC-DC converter is output to the power-feed terminal, the second switching state being a state where output by the AC-DC converter is output to the power-feed terminal; and
   a controller configured to:
      receive a power feed request from the external device through the communication terminal;
      in a case where the image processing apparatus operates in a normal mode in which a power is supplied to the image processor from the AC-DC converter:
         switch the switching unit to the first switching state;
         cause the AC-DC converter to output the first direct voltage to the image processor; and
         cause the variable output DC-DC converter to output the second direct voltage to the external device in accordance with the power feed request; and in a case where the image processing apparatus operates in a power saving mode in which a power is not supplied to the image processor from the AC-DC converter:
switch the switching unit to the second switching state; and
cause the AC-DC converter to output the first direct voltage in accordance with the power feed request to the external device through the power-feed terminal.

2. The image processing apparatus according to claim 1, wherein the controller, in a case where a driving mode of the image processing apparatus is changed from the normal mode to the power saving mode while the variable output DC-DC converter outputting a voltage in accordance with the power feed request, switch the switching unit to the second switching state from the first switching state after instructing the variable output DC-DC converter to output a sum of the voltage in accordance with the power feed request and a particular voltage and instructing the AC-DC converter to output the voltage in accordance with the power feed request.

3. The image processing apparatus according to claim 1, wherein the controller, in a case where a driving mode of the image processing apparatus is changed from the power saving mode to the normal mode while the AC-DC converter outputting the voltage in accordance with the power feed request in the power saving mode, switch the switching unit to the first switching state from the second switching state after instructing the AC-DC converter to output a sum of the voltage in accordance with the power feed request and a particular voltage and instructing the variable output DC-DC converter to output the voltage in accordance with the power feed request.

4. The image processing apparatus according to claim 1, wherein the USB connector is provided to an USB interface,
wherein the USB interface is provided with a controller configured to control power feed to the external device connected to the USB connector, and
wherein the controller is the controller of the USB interface.

5. The image processing apparatus according to claim 4, wherein the switching unit is provided to the USB interface.

6. An image processing apparatus comprising:
an image processor configured to perform an image processing;
a USB connector to which an external device is connectable, the USB connector having a power-feed terminal through which power is fed to the external device and a communication terminal used for communication with the external device;
a power source having an AC-DC converter and a variable output DC-DC converter, the AC-DC converter being configured to convert an alternating voltage supplied from a commercial power source to a first direct voltage and output the first direct voltage, the variable output DC-DC converter being configured to convert the first direct voltage output by the AC-DC converter to a second direct voltage and output the second direct voltage, the second direct voltage output by the variable output DC-DC converter being variable;
a switching unit configured to be switched between a first switching state and a second switching state, the first switching state being a state where output by the AC-DC converter is output to the image processor and output by the variable output DC-DC converter is output to the power-feed terminal, the second switching state being a state where output by the AC-DC converter is output to the power-feed terminal; and
a controller configured to:
receive a power feed request from the external device through the communication terminal;
in a case where a voltage in accordance with the power feed request is equal to or less than a particular value:
switch the switching unit to the first switching state;
cause the AC-DC converter to output the first direct voltage to the image processor; and
cause the variable output DC-DC converter to output the second direct voltage to the external device in accordance with the power feed request; and
in a case where the voltage in accordance with the power feed request is more than the particular value:
switch the switching unit to the second switching state; and
cause the AC-DC converter to output the first direct voltage in accordance with the power feed request to the external device through the power-feed terminal.

7. The image processing apparatus according to claim 6, wherein the controller is configured to:
compare a driving power of the image processor and a voltage in accordance with the power feed request;
set the switching unit to the first switching state in a case where the driving power of the image processor is equal to or less than the voltage in accordance with the power feed request; and
set the switching unit to the second switching state in a case where the driving power of the image processor is more than the voltage in accordance with the power feed request.

8. The image processing apparatus according to claim 6, wherein the switching unit connects the variable output DC-DC converter to the image processor in the second switching state.

9. The image processing apparatus according to claim 6, wherein the USB connector is provided to an USB interface,
wherein the USB interface is provided with a controller configured to control power feed to the external device connected to the USB connector, and
wherein the controller is the controller of the USB interface.

10. The image processing apparatus according to claim 9, wherein the switching unit is provided to the USB interface.

* * * * *